United States Patent [19]
Adler

[11] 4,075,517
[45] Feb. 21, 1978

[54] LINEAR ACTUATOR

[75] Inventor: David George Adler, Drexel Hill, Pa.

[73] Assignee: Sperry Rand Corporation, New York, N.Y.

[21] Appl. No.: 673,021

[22] Filed: Apr. 2, 1976

[51] Int. Cl.² .............................................. H02K 33/00
[52] U.S. Cl. ........................................ 310/13; 360/106
[58] Field of Search ..................................... 310/12–14, 310/27; 360/77, 78, 106

[56] References Cited
U.S. PATENT DOCUMENTS

| 3,430,120 | 2/1969 | Kotaka et al. | 310/14 X |
| 3,924,146 | 12/1975 | George | 310/12 X |

OTHER PUBLICATIONS

"Balanced Force Voice-Coil Actuator", *IBM Tech Disclosure Bulletin*, vol. 15, No. 3, 8/72, p. 749.

*Primary Examiner*—Donovan F. Duggan
*Attorney, Agent, or Firm*—Frank J. Thompson; Eugene T. Battjer; Sheldon Kapustin

[57] ABSTRACT

An electromagnetic actuator is disclosed having a magnetic circuit which provides a plurality of annular, concentrically located air gaps and a plurality of annular actuator forms which are positioned in the air gaps. A winding is mounted on each of the forms and each winding is adapted when electrically energized to establish a field which reacts with a field of the magnetic circuit and causes rectilinear motion of the form in an axial direction. A single magnetic circuit is thereby provided for a plurality of actuating forms and advantageously reduces the iron requirements of the actuator.

14 Claims, 8 Drawing Figures

4,075,517

LINEAR ACTUATOR

BACKGROUND OF THE INVENTION

This invention relates generally to linear actuator devices. The invention relates more particularly to an improved form of electromagnetic linear actuator.

One form of linear actuator comprises an electromechanically operated device which is mechanically coupled to a body to be acted upon and which imparts rectilinear motion to the body. Various systems have operating requirements wherein the body must be rapidly displaced by the actuator over a relatively short distance. For example, a high storage capacity, random access magnetic storage memory which is frequently used with computing systems is a magnetic disk file memory. This memory generally includes a plurality of aligned, spaced-apart disks each having a magnetic medium deposited on its opposite surfaces. Bits of binary information are stored in the form of residual magnetic flux on circular tracks which are located at different radial sectors or zones of a disk. The binary information is stored by rotating the disks and exciting a magnetic head which is positioned adjacent a moving surface of a rotating disk. Readout of data is similarly provided by positioning the head adjacent the moving surface.

Access to stored data at a particular storage track on a disk is provided by an accessor means. The accessor means generally includes a carriage and a magnetic head support arm which transports a magnetic head in a radial direction with respect to a surface of the disk to a selected track location. Since short access time is an important characteristic of a memory device, the head is rapidly accelerated between different storage locations. The head, for example, is expected to move a distance of three or 4 inches in milliseconds. In practice, one or more heads are associated with each disk and are mounted on one or more support arms. The support arms, which are in some arrangements mechanically ganged together, receive motive power for radial transport of the heads from an electromagnetic linear actuator through the carriage. The present invention is directed toward an improved electromagnetic linear actuator arrangement.

A known form of electromagnetic linear actuator which is also referred to in this art as a voice coil comprises a magnetic circuit provided by a permanent magnet having an air gap and a winding or coil which is mounted on a form and which is positioned in the air gap. Electrical energization of the winding establishes a field which reacts with the magnetic circuit and causes rectilinear motion of the form. The form is mechanically coupled to the carriage which in turn is secured to the magnetic head supporting arm. As the winding is electrically energized, it causes rectilinear motion of the form thereby rapidly transporting the heads in a radial direction between different memory locations on the disk. By controlled energization of the winding, a magnetic head is aligned with a preselected data track for recording or recovery of information.

A disk file memory device includes several stacks of aligned, spaced apart disks. Each stack may include on the order of twenty to thirty disks. Various mechanical arrangements have been employed in order to provide access to any track address at any one disk in a file memory. In one arrangement, a separate electromagnetic linear actuator is provided for each disk. Alternatively the number of actuators has been reduced through the mechanical ganging of accessors in combination with electronic selection of one of a number of mechanically accessed disks. In each of these arrangements, the actuator and accessor are preferably positioned in relatively close proximity to the disk file for reducing the complexity of the mechanical arrangement employed. This relatively close spacing as well as the close spacing of disks in a file memory render the size, configuration and arrangement of the various accessor components important. In this regard, the means for providing a stationary magnetic circuit of the electromagnetic linear actuator can be bulky, relatively heavy, and difficult to position in the limited space available adjacent a disk file. For example, the actuator may be required to displace bodies having a total weight of about three pounds. The necessary speed of reaction and length of stroke requires forces which can only be provided by a relatively large permanent magnet. Stationary magnetic circuits weighing seventy pounds are common. It is therefore desirable to provide an electromagnetic linear accelerator of relatively reduced size and weight.

Prior arrangements directed to reducing the overall size of an actuator have utilized at least two windings with common magnetic circuit components. While the prior arrangement has reduced to some extent the size of the required magnetic circuit, it has also resulted in an interaction between the windings and the magnetic circuit necessitating the use of mechanical compensating means for equilibrating the motion of the windings and thus adding to the complexity of the actuator.

Accordingly, it is an object of the present invention to provide an improved electromagnetic linear actuator.

Another object of the invention is to provide an improved electromagnetic linear actuator for a disk file memory.

Another object of the invention is to provide an improved electromagnetic linear actuator having a magnetic circuit adapted for operation with a plurality of actuating windings.

Another object of the invention is to provide a multi-winding electromagnetic linear actuator of relatively reduced size and complexity.

Another object of the invention is to provide an electromagnetic linear actuator of modular construction which facilitates expansion of the actuator to receive additional windings.

A further object of the invention is to provide a multi-winding electromagnetic linear actuator in which the windings are adapted to be displaced in opposite directions.

Another object of the invention is to provide an electromagnetic linear actuator arrangement having a plurality of windings wherein one winding operates to provide coarse positioning of a body and a second winding operates to provide fine or vernier positioning of the body.

SUMMARY OF THE INVENTION

In accordance with the general features of the present invention, an electromagnetic linear actuator comprises magnetic means for providing a magnetic circuit having a plurality of annular, concentrically located air gaps and a plurality of annular actuator forms positioned in the air gaps. A winding is mounted on each of the forms and each winding is adapted, when electrically energized, to establish a field which reacts with a field of the magnetic circuit and cause rectilinear motion of the form in an axial direction. By providing a plurality of air gaps in the same magnetic circuit and an actuator form and winding in each air gap, the windings can be independently controlled thereby reducing the iron requirements for an equivalent number of actuators and reducing the interaction between the windings. The separate windings can be actuated to control separate accessors in a disk file memory or alternatively, the separate windings can be employed to provide both coarse and vernier positioning of a single accessor.

In accordance with other features of the invention, the magnetic circuit is of modular construction whereby the actuator can be expanded to provide additional air gaps for receiving additional numbers of actuator forms and windings.

BRIEF DESCRIPTION OF THE DRAWINGS

These and other objects and features of the invention will become apparent with reference to the following specification and to the drawings wherein.

DETAILED DESCRIPTION

Figure 1:
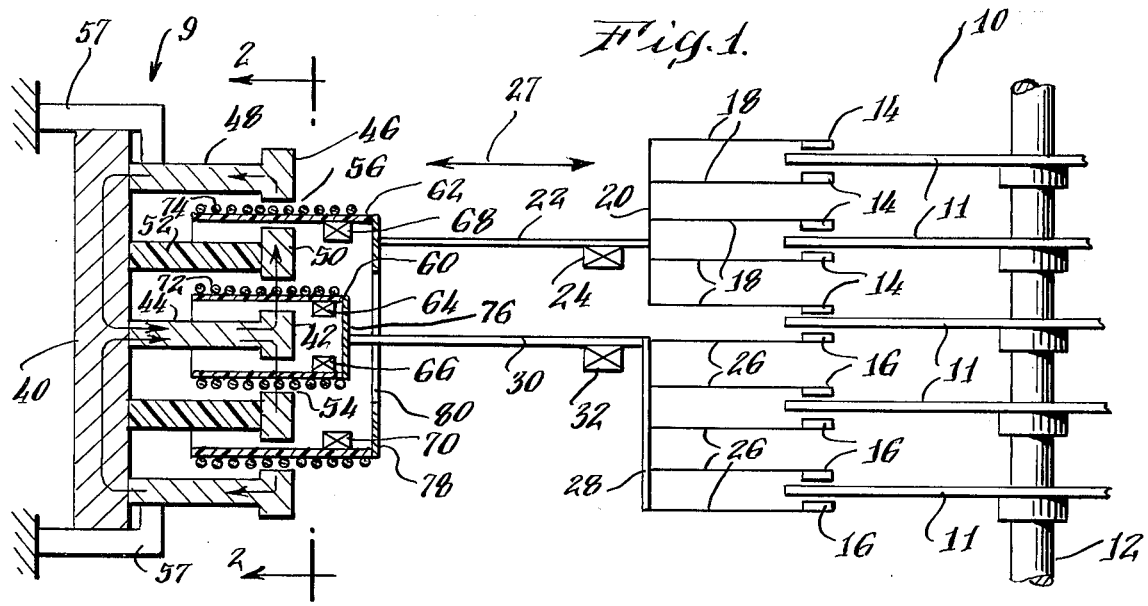
FIG. 1 is a side elevation view partly in section of an accessor arrangement for a disk file memory utilizing an electromagnetic linear actuator constructed in accordance with features of one embodiment of the invention.

Referring now to FIG. 1, a linear actuator 9 is shown arranged for actuating magnetic heads in a disk file memory 10. The disk file comprises a plurality of circular disks 11 which are supported on and are simultaneously rotated by a shaft 12 extending through a centrally located aperture in each disk. Each disk 11 has a layer or film of magnetic material deposited on its surfaces. The magnetic material is adapted to store binary data as residual flux in circular tracks on the disk. As many as eight hundred circular tracks are provided which are positioned radially along the disk surface extending from an outer edge thereof toward the shaft 12.

A plurality of magnetic heads 14 are provided for recording and reading back binary information from a disk 11. The heads 14 are mounted on support arms 18 which are mechanically ganged together at a bar 20. The bar 20 is coupled to a transport carriage 22 which is supported on a bearing 24. Rectilinear motion is imparted to the carriage 22 in the direction indicated by the arrows 27 by the linear actuator 9 and the heads 14 are thus transported to any one of the addressed, radially located track locations on a disk 11. A particular head 14 which is to be excited for recording data or which is to recover stored data is electronically selected by switching circuit means, not illustrated, which couples the selected head 14 to a circuit means for the recording or readback operation. The heads 16 are similarly supported by arms 26 which are mechanically coupled together by a bar 28. The bar 28 is mechanically coupled to a transport carriage 30 which is supported on a bearing 32. Rectilinear motion is also imparted to the carriage 30 by the linear actuator 9 for transporting the heads 16 to any one of the addressed track locations. As described hereinafter, the carriages 22 and 30 are actuated by the linear actuator 9 either independently or simultaneously as required by the memory system.

Figure 2:
FIG. 2 is a view taken along lines 2—2 of FIG. 1.

The linear actuator 9 which is constructed in accordance with features of the present invention includes a magnetic means which forms a magnetic circuit. The magnetic means comprises a plurality of members including a base member 40, a centrally located member 42 and a first spacer member 44 which supports the member 42 at a spaced apart location from the base member 40. While the members 40, 42 and 44 can assume various configurations, it is preferable that they have cylindrical configurations as illustrated in FIGS. 1 and 2. The magnetic circuit also includes an outer, annular shaped member 46 and a second spacer member 48 which is annular shaped and which supports the outer member 46 at a spaced apart location from the base member 40. The member 46 is preferably circular or ring shaped and the member 48 preferably is formed as a thick wall tubular body. An annular shaped intermediate magnetic circuit member 50 is provided and is positioned about the central member 42 and between the central member and the outer annular shaped member 46. This member 50 is preferably circular or ring shaped and is supported at a spaced apart location from the base 40 between the central and outer members 42 and 46 by a third spacer body 52 which is formed of a non-magnetic or high reluctance material. The magnetic circuit arrangement thus described provides a plurality of annular shaped air gaps 54 and 56 which are concentrically located. The cylindrically shaped member 42 and the ring shaped member 50 will provide a first circular shaped air gap 54 between these members while the ring shaped members 50 and 46 will provide a second circular shaped air gap 56 of relatively larger diameter between the intermediate and the outer member 46.

The magnetic circuit members 40, 42, 44, 46, 48 and 50 are preferably formed of a high permeability ferromagnetic material. Many of the present well known high permeability materials including iron, nickel iron, and the various well known ferromagnetic alloys may be utilized. The members 40, 42, 44, 46 and 48 may be integrally formed by casting these members as a single body and machining the cast body to desired dimensions. Alternatively, they may be individually formed and secured by welding, suitable adhesives, such as epoxy resins, etc., to form the illustrated magnetic circuit arrangement.

The member 52 is formed of a non-magnetic, high reluctance material. A suitable material comprises a phenolic polymer plastic which is secured to the base 40 and to the ferromagnetic member 50 by a suitable adhesive such as epoxy resin or the like. Alternatively, the body 52 may be formed of a non-ferromagnetic metal such as aluminum or one of the non-ferromagnetic class of stainless steels and assembled by welding or by adhesives. The magnetic circuit assembly is rigidly mounted to a machine frame by non-magnetic frame members 57.

The described assembly forms a magnetic circuit which establishes a relatively intense magnetic field in the air gaps 54 and 56. The magnetic flux and its direction in the magnetic circuit is illustrated by the arrows in FIG. 1. A magnetic field is established by permanently magnetizing at least one of the members of the magnetic circuit, such as the base member 40, and preferably by permanently magnetizing all of the magnetic members of the circuit. The members are permanently magnetized in a well known manner by placing the entire assembly of members in an intense magnetic field for an interval of time sufficient to establish a desired level of permanent magnetism in the assembly.

A plurality of annular actuator forms are provided and are positioned in the air gaps of the magnetic circuit. A first annular shaped actuator form 60 is shown to be tubular shaped and is positioned in the air gap 54. A second annular actuator form 62 is also shown to be tubular shaped and to be positioned in the air gap 56. The form 60 is supported in the air gap by bearings 64 and 66 while the form 62 is supported in the air gap by bearings 68 and 70. The forms 60 and 62 each have longitudinal axes extending in the direction of their length and are adapted to move in the axial directions within the air gap on their associated bearings.

A plurality of actuator windings are provided and are mounted on the actuator forms. A first winding 72 is arranged in the form of a coil and is mounted on the actuator form 60. A second winding 74 is also arranged in the form of a coil and is mounted on the actuator form 62. Each of these windings includes a predetermined number of turns of wire of a diameter for providing a predetermined resistance to an energizing potential applied thereto. The winding is adapted to carry an energizing current for establishing an electromagnetic field which reacts with the magnetic field of the permanent magnet and cause axial motion of the associated actuator form. The direction of axial motion is determined by the direction of current flow in a winding.

The annular actuator forms 60 and 62 are formed of a non-ferromagnetic and electrically resistive material, such as a phenolic plastic. An aluminum disk 76 is secured to one end of the form 60 by an adhesive such as an epoxy resin. The carriage 30 is mechanically coupled to the disk 76 by a mechanical coupling means such as a screw mounting or a threaded fitting to the disk 76. An aluminum ring shaped member 78 is similarly secured to one end of the form 62 by an adhesive such as an epoxy resin. The carriage 22 is mechanically coupled to the disk 78 by a mechanical coupling means such as a screw mounting or a threaded fitting. For purposes of simplifying the drawings, the coupling of the carriage 22 to disk 78 is shown to occur at a single location. However, for purposes of uniform load distribution over the form 62, the carriage 22 is coupled to the disk 78 at several locations. When the coil 74 is energized, the form 62 will be actuated in an axial direction and will impart rectilinear motion to the carriage 22 and to the heads 14. Similarly, when the winding 72 is energized, the form 60 will be actuated in an axial direction and will impart rectilinear motion to the carriage 30 and to the heads 16. An aperture 80 is formed in the disk 78 for providing unimpeded movement of the form 60 in the axial direction when the form 62 is in a stationary home position within the air gap 56. Each of the forms 60 and 62 can be operated either individually or simultaneously.

The linear actuator 9 is adapted to provide relatively rapid acceleration and deceleration of the magnetic heads 14 and 16 between different addressed tracks on the disks 11. The forms 60 and 62, in providing this movement, are generally required to have a stroke on the order of four inches and to have a transit time over this length of stroke on the order of milliseconds. A linear actuator adapted to provide these operating characteristics requires a relatively large mass of iron having a weight which is on the order of 70 pounds. Physical dimensions of this actuator are also significant and the member 40, for example, can have a diameter of about eight inches. The described actuator is therefore advantageous in that it provides a single magnetic circuit for establishing the magnetic field for a plurality of actuator forms. The linear actuator described is further advantageous in that, by providing a separate air gap for each of the actuator forms, these forms can be actuated substantially independently of each other and maximum utilization of the magnetic field intensity is provided.

Figure 3:
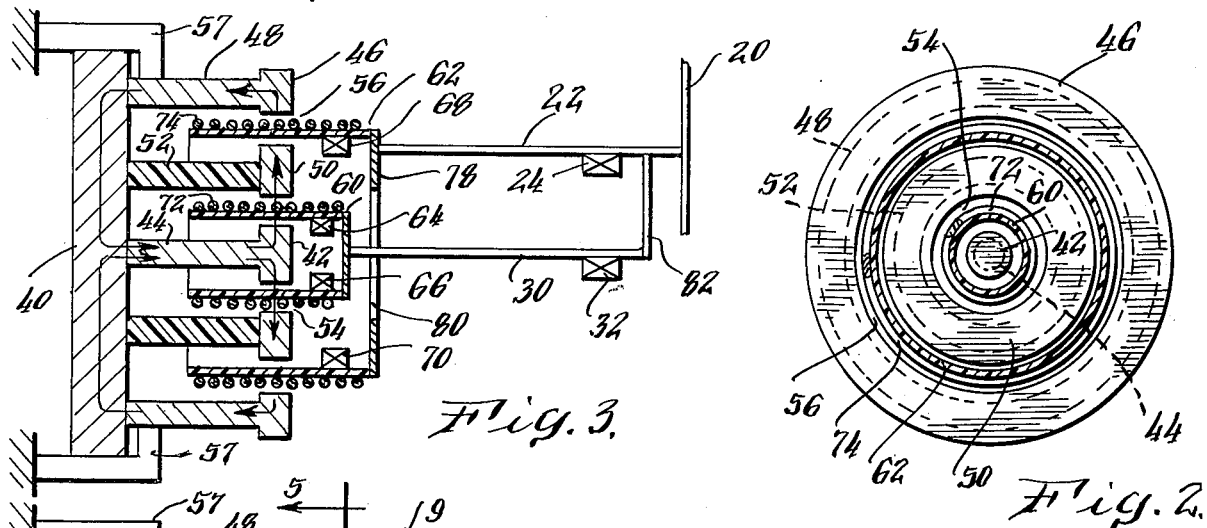
FIG. 3 is a side elevation view in section of the actuator of FIG. 1 which is mechanically coupled for coarse and vernier positioning of an accessor.

FIG. 3 illustrates an alternative embodiment of the linear actuator of FIGS. 1 and 2 wherein the actuator forms 60 and 62 are mechanically intercoupled for providing coarse and vernier operations. In FIGS. 3–8 various elements which perform functions similar to elements described with respect to FIG. 1 bear the same referene numerals. The carriages 22 and 30 of FIG. 3 are intercoupled by a bar 82 and both actuators 60 and 62 operate to position the heads 14 which are coupled to the bar 20. In this case, the coil 74 of the form 62 is excited for establishing a relatively coarse positioning of the heads 14 with respect to an addressed track while the winding 72 is excited for providing relatively fine or vernier positioning of the heads from a coarsely located position.

Figure 4:
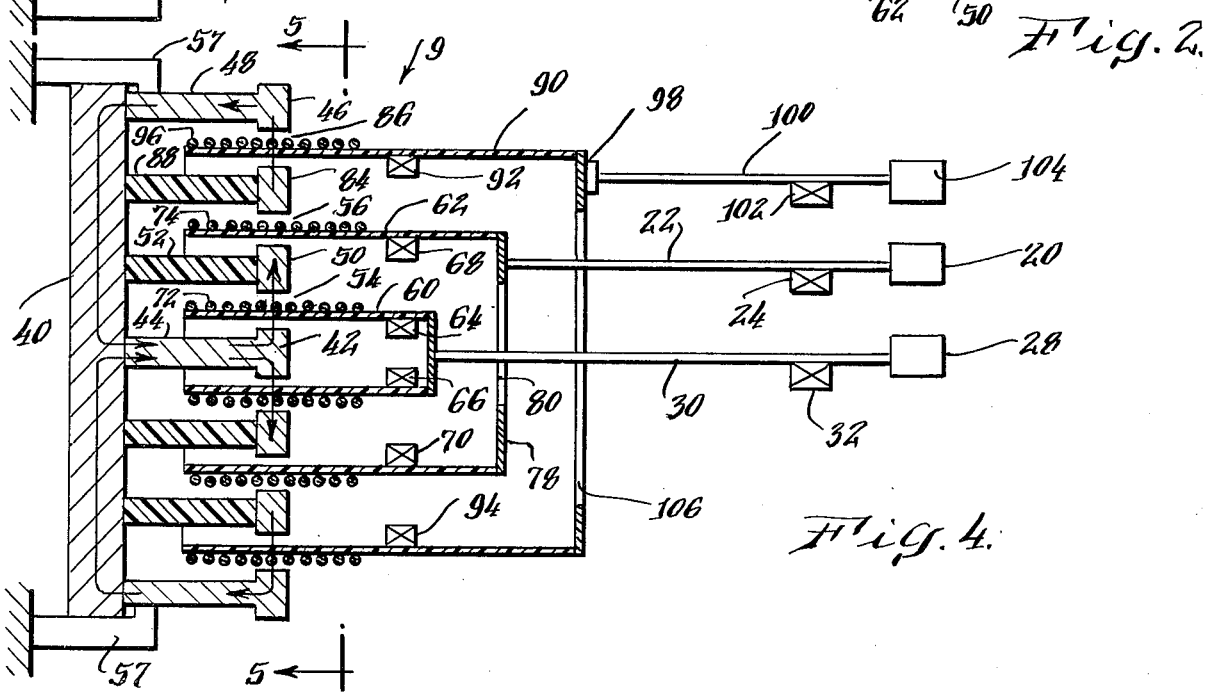
FIG. 4 is a side elevation view of the actuator of FIG. 1 shown expanded to receive an additional winding and illustrating its modular construction.
Figure 5:
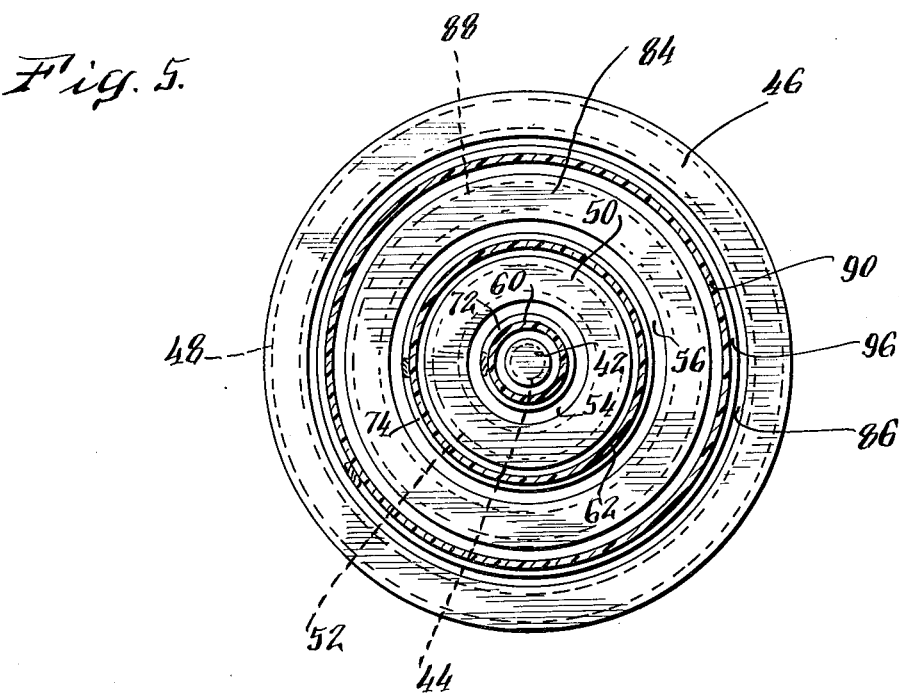
FIG. 5 is a view taken along lines 5—5 of FIG. 4.

In accordance with another feature of the invention, the linear actuator is of a modular construction providing for additional actuator forms. Referring now to FIG. 4, the linear actuator 9 is shown to include a second intermediate, annular shaped magnetic circuit member 84 which is positioned between the intermediate member 50 and the outer member 46 to provide a third annular, concentrically located air gap 86. The member 84 is formed of a ferromagnetic material and is preferably ring shaped. It is supported by a fourth spacer body 88 formed of a non-magnetic high reluctance material such as a phenolic plastic which is annular shaped and which is preferably tubular shaped. The ring 84 is secured to the member 88 and the member 88 is secured to the base 40, for example, by an adhesive such as an epoxy resin.

A third annular actuator form 90 is provided and is positioned in the air gap 86. The form 90 is supported on bearings 92 and 94 and is formed of a non-magnetic, electrically resistive material such as phenolic or the like. A third actuator winding 96 is mounted on the actuator form 90 and is adapted when energized to cause the form 90 to move in an axial direction along a longitudinal axis of the form as described hereinbefore with respect to FIG. 1. An aluminum disk 98 is secured to one end of the form 90 by an adhesive such as an epoxy resin and a carriage 100 is mounted to the disk 98. Axial motion of the form 90 imparts rectilinear motion to the carriage 100 which is supported on a bearing 102. The carriage 100 is mechanically coupled to an arm bracket 104 which in turn is coupled to support arms for transporting magnetic heads to an addressed track location. An aperture 106 is formed in the disk 98 permitting unimpeded motion of the forms 60 and 62 and their associated carriages.

Figure 6:
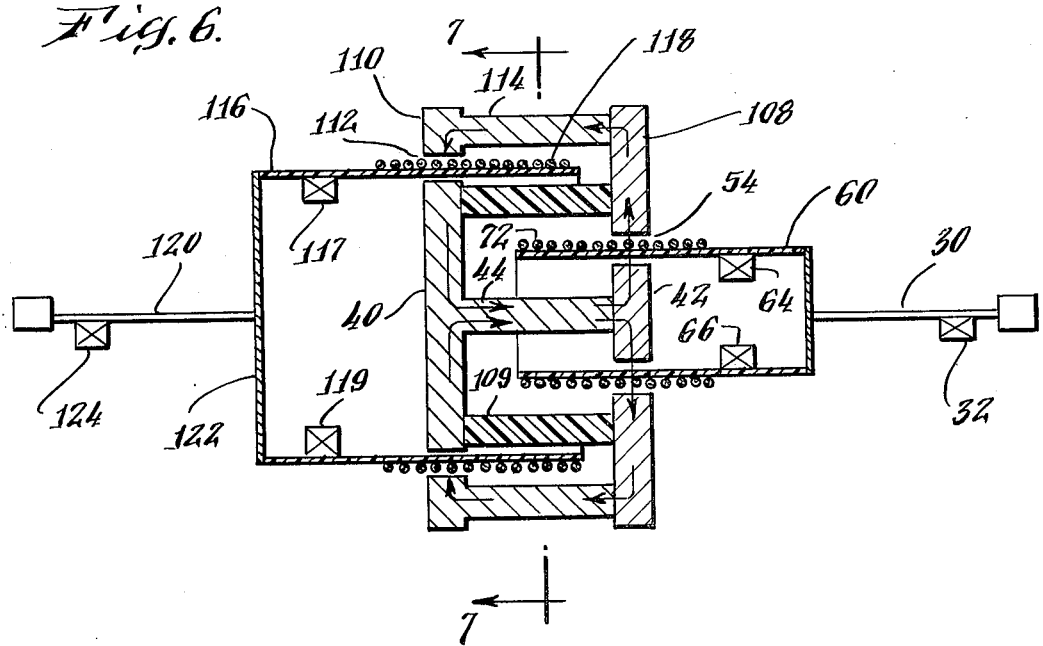
FIG. 6 is a side elevation view of another embodiment of an electromagnetic actuator constructed in accordance with features of this invention.
Figure 7:
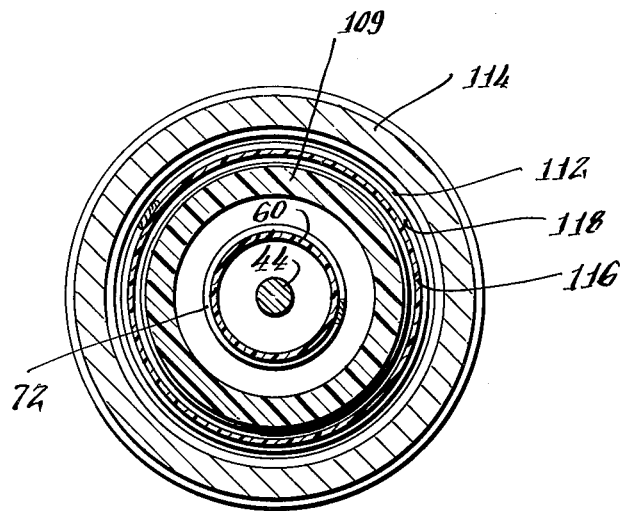
FIG. 7 is a view taken along lines 7—7 of FIG. 6.

A linear actuator in accordance with a feature of this invention which provides for motion of the actuator forms in opposite directions is illustrated in FIG. 6. While in FIGS. 1 through 5, it is noted that the plurality of air gaps are located near one end of the generally cylindrically shaped magnetic circuit, it will be noted in FIG. 6 that at least one air gap is located at one end of the magnetic circuit means while a second air gap is located at an opposite end thereof. The linear actuator of FIG. 6 includes a ferromagnetic base member 40 positioned at a first end of the actuator, a ferromagnetic centrally located member 42 positioned at a second end of the actuator, a first ferromagnetic spacer member 44 supporting the centrally located member 42 at a spaced apart location from the base member 40 and a first ferromagnetic outer annular shaped member 108. The outer member 108 which is preferably ring shaped is supported at a spaced apart location from the base member 40 by a second spacer member 109 which is formed of a non-ferromagnetic high reluctance material. It is noted that the outer member 108 extends beyond the periphery of the base member 40 and provides support for a second ferromagnetic annular shaped outer member 110 which is positioned about the base member 40 and which forms an annular shaped air gap 112 therewith. The outer member 110 is supported from the outer member 108 by a third ferromagnetic annular shaped spacer member 114 which is preferably formed as a thick wall tubular body. An assembly of the members 108, 110 and 114 has a generally L shaped cross section in which the base member 108 of this L shaped cross sectional configuration forms an annular air gap with the member 42.

The linear actuator of FIG. 6 includes a first actuator form 60 which extends in the air gap 54 and a second actuator form 116 which extends in the air gap 112. A winding 118 is mounted on this form. The form 116 is fabricated of a non-magnetic electrically non-conductive material such as phenolic and an aluminum disk 122 is secured to one end of the form 116 by an adhesive such as epoxy resin. The carriage 120 is supported on a bearing 124 and is coupled to the disk 122 by screws or threaded fittings for imparting motion to the carriage 120 when the actuator form 116 is actuated in an axial direction.

While the forms 60 and 116 are concentrically located, the winding 118 which is mounted on the form 116 is adapted to cause axial motion of the form 116 for causing actuation of an associated carriage 120 toward the left as viewed in FIG. 6. Thus, the actuator forms 60 and 116 are adapted to displace bodies being acted upon in opposite directions. This linear actuator is adapted to be used with a stack of disk files and to be positioned between adjacent stacks whereby the actuator 60 operates on magnetic heads associated with one disk file stack while the actuator 116 operates on magnetic heads associated with a second different disk file stack.

Figure 8:
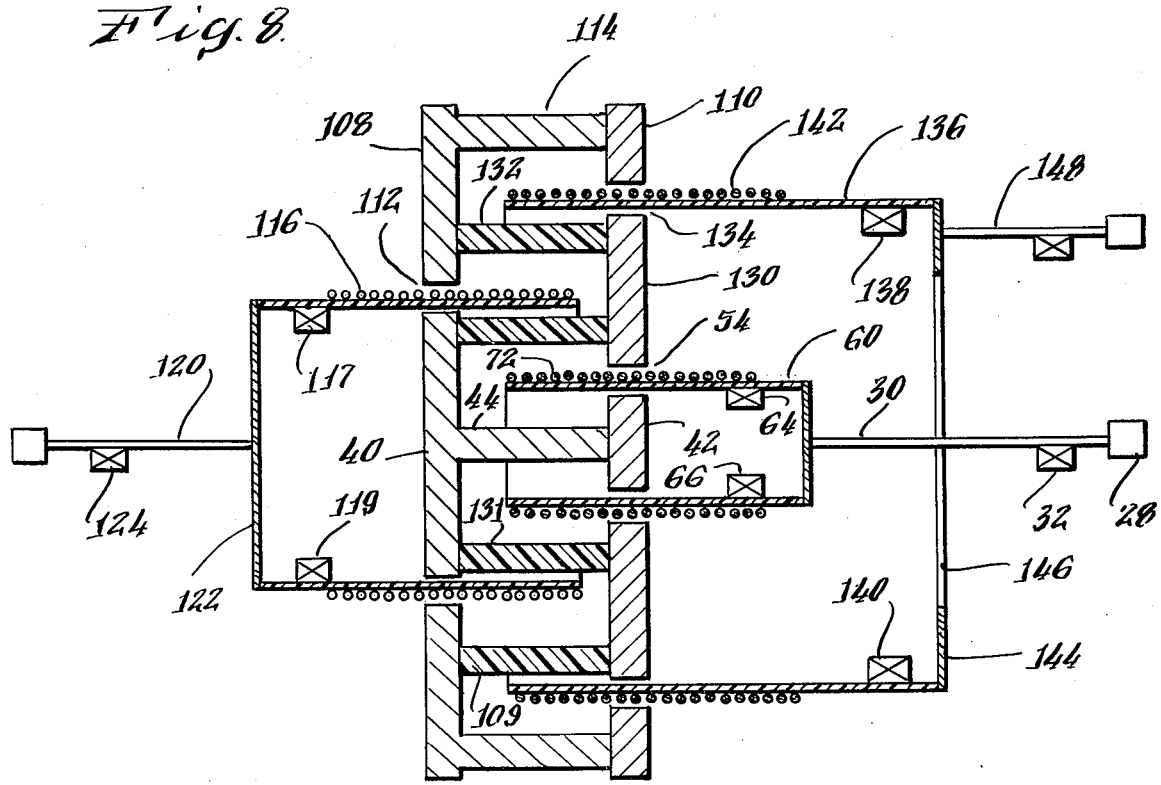
FIG. 8 is a side elevation view in section of an alternative arrangement of the embodiment of FIG. 6 expanded to receive an additional winding and illustrating its modular construction.

The linear actuator arrangement of FIG. 6 is also of modular construction and is adapted to receive additional actuator forms. As is illustrated in FIG. 8, an intermediate ferromagnetic annular shaped member 130 is provided and is supported adjacent the centrally located member 42 to provide the first air gap 54 therebetween. The member 130 is supported in a spaced apart location from the base 40 by a non-magnetic spacer member 131 which is formed of a high reluctance material. The generally L shaped cross sectional assembly of the members 108, 114 and 110 of FIG. 6 wherein the members 108, 114 and 110 comprise base, spacer and cross segments of the L is now reversed in orientation as is illustrated in FIG. 8. Base segment 108 of the L shaped assembly is supported by a second non-ferromagnetic, high reluctance spacer member 132 from the intermediate member 130 and is positioned about the base member 40 to form an annular shaped air gap 112 therewith. A third air gap 134 is formed between member 130 and the segment 110 which is supported and positioned about the intermediate member 130. An annular shaped actuator form 136 is positioned in the air gap 134 and is supported on bearings 138 and 140. An actuator winding 142 is mounted on the form 136 and is adapted, when energized, to cause motion of the form 136 along a longitudinal axis thereof. The form 136 is fabricated of a non-ferromagnetic, electrically resistive material such as a phenolic plastic and an aluminum disk 144 having an aperture 146 formed therein is secured to one end of the form 136. The disk 144 is secured to the form 136 by adhesive such as an epoxy resin. A carriage 148 is secured to the disk 144 for imparting rectilinear motion to a body being acted upon.

While the described linear actuator is particularly adapted as an actuating means for read/write heads in a disk file memory, the actuator can be beneficially utilized in other systems and arrangements. For example, the actuator can be employed with servosystems where rapid, short stroke linear displacements are required. It can also be employed in various mechanical machining and finishing operations such as controlling the position of cutter bits in a lathe and controlling the position of machining surfaces in blanching, lapping or grinding operations.

An improved linear actuator has thus been described having a plurality of concentrically located air gaps formed in a single magnetic circuit and a plurality of actuator forms positioned in the air gaps. The provision of a single magnetic circuit for operating on a plurality of actuator forms reduces the iron required for an equivalent number of actuators and the provision of separate air gaps provides substantial independence in the operation of the different actuator forms. The actuator is also advantageously of modular construction and can be coupled for coarse and vernier control of a body being acted upon.

While I have described particular embodiments of my invention, it will be apparent to those skilled in the art that variations may be made thereto without departing from the spirit of the invention and the scope of the appended claims.

What is claimed is:

1. An electromagnetic linear actuator comprising:
   magnetic means providing a magnetic circuit having a plurality of annular, concentrically located air gaps in said circuit;
   a plurality of annular actuator forms, each of said forms having a longitudinal axis and each form positioned in one of said air gaps; and
   a plurality of actuator windings, each of said windings mounted on an actuator form and adapted, when electrically energized, to establish an electromagnetic field which reacts with a field of the magnetic circuit and cause rectilinear motion of the associated form in the direction of the longitudinal axis.

2. The linear actuator of claim 1 wherein said magnetic means includes a plurality of members providing a cylindrically shaped magnetic circuit.

3. The linear actuator of claim 2 wherein said air gaps are formed at one end of said cylindrically shaped magnetic circuit.

4. The linear actuator of claim 2 wherein at least one of said air gaps is located at a first end of said cylindrically shaped magnetic circuit and at least one of said air gaps is located at a second opposite end of said cylindrically shaped magnetic circuit.

5. The linear actuator of claim 1 wherein said magnetic circuit is provided by a permanent magnet.

6. The linear actuator of claim 5 wherein said magnetic circuit is provided by a plurality of permanently magnetized ferromagnetic members.

7. A linear actuator comprising:
a base member formed of a ferromagnetic material;
a centrally located member formed of ferromagnetic material;
a first spacer member formed of ferromagnetic material for supporting said centrally located member at a spaced apart location from said base member;
an outer, annular shaped member formed of ferromagnetic material;
a second annular shaped, spacer member formed of ferromagnetic material for supporting said outer member at a spaced apart location from said base member;
an annular shaped intermediate member formed of ferromagnetic material and positioned between said central and outer members to form first and second annular concentrically located air gaps, with said central and outer members;
a third spacer body formed of a high reluctance material for supporting said intermediate member at a spaced apart location from said base between said central and outer, annular members;
at least one of said ferromagnetic members permanently magnetized for establishing a magnetic field in said ferromagnetic members and in said air gaps;
first and second annular actuator forms each having a longitudinal axis thereof and positioned in said first and second air gaps respectively; and,
an electric winding mounted on each of said forms and adapted when energized to establish an electromagnetic field which reacts with a field of said magnetic circuit and causes the associated coil form to move in an axial direction.

8. The linear actuator of claim 7 wherein said annular shaped members are each circular shaped.

9. The linear actuator of claim 7 including a second intermediate annular shaped member formed of ferromagnetic material which is positioned between said intermediate member and said central or outer member to form therewith a third annular concentrically located air gap, a fourth spacer body of high reluctance material supporting said second intermediate member at a spaced apart location from said base, a third annular actuator form having a longitudinal axis thereof positioned in said third air gap, and an electric winding mounted on said third form and adapted, when energized, to establish an electromagnetic field which reacts with a field of said magnetic circuit and causes said third form to move in an axial direction.

10. The linear actuator of claim 7 wherein said first and second forms are mechanically coupled whereby energization of one of said windings provides a coarse axial displacement of said forms and energization of the other of said windings causes a vernier axial displacement of the forms.

11. A linear actuator comprising:
a base member formed of a ferromagnetic material;
a centrally located member formed of a ferromagnetic material;
a first spacer member formed of ferromagnetic material for supporting said centrally located member at a spaced apart location from said base member;
a first outer annular shaped member formed of ferromagnetic material;
a second spacer member formed of high reluctance material for supporting said outer member at a spaced apart location from said base and about said central member to form a first annular shaped air gap therewith;
a second outer annular shaped member formed of ferromagnetic material;
a third spacer member formed of a ferromagnetic material for supporting said second outer annular shaped member at a spaced apart location from said first outer member and about said base member to form a second annular shaped air gap therewith;
at least one of said ferromagnetic members permanently magnetized for establishing a magnetic field in said ferromagnetic members and in said air gaps;
first and second annular shaped actuator forms each having a longitudinal axis thereof positioned in said first and second air gaps respectively; and,
an electric winding mounted on each of said forms and adapted, when energized, to establish an electromagnetic field which reacts with a field of said magnetic circuit and causes the associated coil form to move in an axial direction.

12. The linear actuator of claim 11 wherein said annular shaped members are each circular shaped.

13. A linear actuator comprising:
a base member formed of ferromagnetic material;
a centrally located member formed of ferromagnetic material;
a first spacer member formed of ferromagnetic material for supporting said centrally located member at a spaced apart location from said base member;
an annular shaped intermediate member formed of ferromagnetic material,
a second spacer member formed of a high reluctance material for supporting said intermediate member at a spaced apart location from said base and about said central member to form a first annular shaped air gap therewith, said intermediate member extending beyond the periphery of said base member in a radial direction;
an annular shaped assembly of ferromagnetic members having an L shaped cross section including a base segment and a cross segment spaced apart by a spacer segment;
a third spacer member formed of a high reluctance material for supporting said assembly and positioning said base segment at a spaced apart location from said intermediate member and about said base member to form a second annular shaped air gap therewith and positioning said cross segment about said intermediate member to form a third annular shaped air gap therewith;

at least one of said ferromagnetic members permanently magnetized for establishing a magnetic field in said ferromagnetic members and in said air gaps;

first, second and third annular shaped actuator forms each having a longitudinal axis thereof positioned in said first, second and third air gaps respectively; and, an electric winding mounted on each of said forms and adapted, when energized, to establish an electromagnetic field which reacts with a field of said magnetic circuit and causes the associated coil form to move in an axial direction.

14. A linear actuator for a disk file memory comprising:

a plurality of disks having magnetic surfaces;
first and second magnetic heads;
means for supporting said heads adjacent said disks;
magnetic means providing a magnetic circuit having first and second annular, concentrically located air gaps in said circuit;
first and second annular actuator forms each having a longitudinal axis thereof and positioned in said first and second air gaps respectively;
first and second windings mounted on said first and second actuator forms and adapted when electrically energized, to establish an electromagnetic field which reacts with a field of the magnetic circuit and cause rectilinear motion of the associated form in an axial direction; and,
means for mechanically coupling said first and second forms to said first and second heads respectively for causing motion of a head with respect to a disk.

* * * * *